Feb. 26, 1929.

L. H. ZEPP 1,703,564

CENTERING PIN FOR DISK ROLLING MILLS

Filed Jan. 3, 1927

INVENTOR.
L. Henry Zepp,
BY
ATTORNEY.

Patented Feb. 26, 1929.

1,703,564

UNITED STATES PATENT OFFICE.

L HENRY ZEPP, OF PHILADELPHIA, PENNSYLVANIA, ASSIGNOR TO BUDD WHEEL COMPANY, OF PHILADELPHIA, PENNSYLVANIA, A CORPORATION OF PENNSYLVANIA.

CENTERING PIN FOR DISK ROLLING MILLS.

Application filed January 3, 1927. Serial No. 158,509.

The present invention consists of a blank-centering pin for rolling mills of the type shown in patent Number 1,606,903 dated November 16, 1926, on process and apparatus for forging metallic disks by John W. Smith.

The invention aims to provide a pilot pin for the rotating platen of a machine, similar to one of the above mentioned type, whereby the blank is held to the table and relative rotation therebetween obviated without the use of the hold-downs, clamps and other retaining devices heretofore deemed necessary.

Another object of the invention is to provide an improved form of pin by means of which the blank to be rolled is readily engaged therewith and rapidly placed in its proper relation to the platen of the rolling mill.

Figure 1:
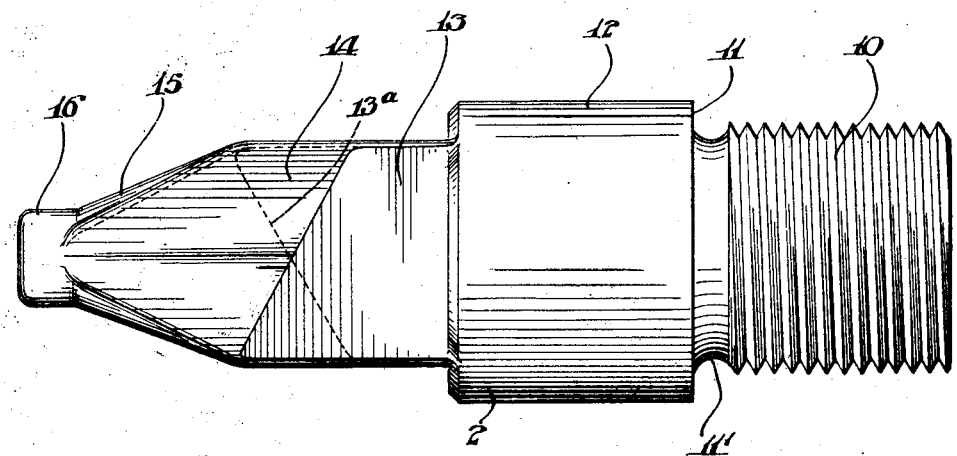
Figure 3:
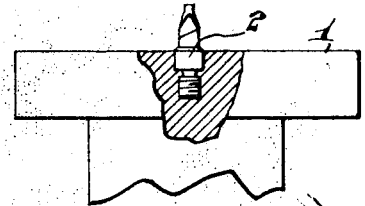
Figure 2:
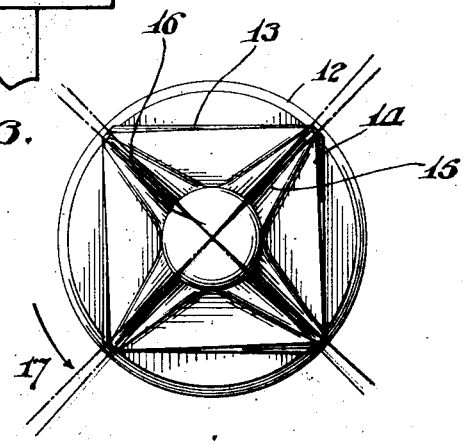

Other objects, and the advantages of the invention will become apparent from the following description and the drawings in which, Fig. 1 is a side view of the improved pilot pin, Fig. 2 is an end view thereof, and Fig. 3 is a view, to a smaller scale, of the improved pin as it appears in place in the rotating platen of the rolling mill.

In the above-mentioned patent, rolling mills are shown in which a substantially circular blank of uniform thickness is held on a rotating platen and rolled to a tapered form by radially traversing rolls. Heretofore the blank has been held to the platen and against rotation relative thereto, by a clamping device. The present invention provides a centering and retaining pilot pin which eliminates the necessity for such clamping devices, while performing the same functions.

The improved pin designated generally by the numeral 2, is shown in Fig. 3, seated in a suitable centering cavity of the rotating platen 1, of a machine as described above. The improved pin comprises several novel features designed for the several purposes of retaining it in the platen, of aligning it therewith, of engaging the blank to guide it to the platen and to secure it thereon.

In greater detail the new pilot pin comprises a threaded lower end 10, a shoulder 11 separated from the threaded portion by a relieved portion 11' and an enlarged cylindrical portion 12. The threads of the part 10 engage a correspondingly threaded portion of the pin's seat in the platen, and hold it therein. The relieved portion 11' insures the correct seating of shoulder 11 with its coacting shoulder on the platen. The portion 12 engages a corresponding bore in the pilot pin seat and provides for accurate alignment of the pin with the axis of rotation of the platen. The combined action of the above elements, it may be seen, is to secure the pin in place in proper relation to the platen, while providing for it easy removal or replacement.

The above-mentioned shoulder 11, positions the pin so that the remaining undescribed portions project above the surface of the platen. These portions comprise a polygonal shank 13, a similar polygonal, twisted leading portion 14, a transitional tapering portion 15 and a smaller nib, or locating portion 16.

The polygonal portion or shank 13, in this instance square, with a slightly rounded corners, corresponds to a similar, central orifice prepared in the blank for cooperation therewith. The twisted portion 14 is of similar polygonal conformation and is twisted in such a way as to give a lead or advance in the direction of rotation of the platen as shown by the arrow 17, Figure 2. Dash and dot lines in Fig. 2 show the diagonals of the shank 13. Displaced dotted lines show the diagonals of the portions 14 and 15. Line 13ª denotes the meeting of the face portions 13 and 14.

The nib 16 and the transitional portion 15 are provided to facilitate the engagement of the pin by the central orifice of the blank and subsequently to guide the blank down to the polygonal portions 14 and 13. The portion 15 as clearly shown has the same twist as the portion 14.

The latter portions 14 and 13 serve respectively, to lead the blank down to the platen to its final position and to secure it therein. The twisted portion 14 thus serves as a guide to aid in the registration of the central aperture of the blank with the polygonal portion of the pin.

The device operates in a very simple manner. In accordance with the applications above referred to, the platen 1, rotates continuously while the mill is being used. Having displaced a previously-rolled blank in any suitable manner, all that the operator of the machine need do to reload the platen is to place the central aperture of the blank over the nib 16 of the pin and release the blank. Thereupon, the blank will fall to the platen, due to its weight, being guided into registration with the pin and retention thereby, by surfaces 15 and 14, respectively. Thus a positive, simple and efficient means is provided to replace the previous complicated clamping devices, and carry out all their functions.

Due to its construction as a separate part of the platen, the pin may be made of material, such as alloy steel, suitable to resist the wear to which it is exposed.

Having thus described the invention, what is claimed and is desired to be secured by Letters Patent is:

1. A blank-centering and retaining device for a rotating rolling mill platen, comprising a twisted, polygonal pin.

2. A blank-centering and retaining device for a rotary rolling mill platen, comprising a polygonal pin whose sides are formed in helical surfaces.

3. A blank-centering pin for a rotatable platen comprising a twisted polygonal pin with a substantially conical point.

4. A blank-retaining pin for a rotatable platen comprising a twisted polygonal pin having a reduced end portion connected therewith by a substantially conical transitional portion.

5. A blank-centering and retaining pin for a rotating platen comprising a twisted polygonal pin, said twist being in the direction of rotation of the platen.

In testimony whereof he hereunto affixes his signature.

L HENRY ZEPP.